United States Patent [19]

Hikita

[11] Patent Number: 5,364,710
[45] Date of Patent: Nov. 15, 1994

[54] APPARATUS FOR CONVERTING LIGHT ENERGY INTO ELECTRIC ENERGY AND STORING THE SAME

[75] Inventor: Kazuyasu Hikita, Saitama, Japan

[73] Assignee: Mitsubishi Materials Corporation, Tokyo, Japan

[21] Appl. No.: 923,252

[22] Filed: Jul. 31, 1992

[30] Foreign Application Priority Data

Aug. 23, 1991 [JP] Japan .................... 3-237377

[51] Int. Cl.⁵ .................. H01M 12/00; H01M 10/44; H01L 31/04
[52] U.S. Cl. ........................................ 429/9; 136/254; 136/291; 257/1; 257/431; 320/1; 320/2
[58] Field of Search .............. 136/254, 291; 429/9; 320/1-2; 257/1, 431; 250/214 SG, 214.1

[56] References Cited

U.S. PATENT DOCUMENTS

| | | | |
|---|---|---|---|
| 3,855,004 | 12/1974 | Brody | 136/254 |
| 4,009,051 | 2/1977 | Kazis et al. | 320/15 |
| 4,481,265 | 11/1984 | Ezawa et al. | 429/9 |

Primary Examiner—Aaron Weisstuch
Attorney, Agent, or Firm—McAulay Fisher Nissen Goldberg & Kiel

[57] ABSTRACT

An apparatus for converting light energy into electric energy and storing the same, which comprises a photoelectric conversion unit having an element that generates an electromotive force by irradiation of light and a unit for storing electric energy generated by the photoelectric conversion unit. The element comprises a ferroelectric crystal having a bulk photovoltaic effect such as $BaTiO_3$, lead lanthanum zirconate titanate (PLZT) or the like. Light energy is converted into electric energy having a voltage ranging from 10 V to several kV with high reliability to be efficiently stored.

5 Claims, 1 Drawing Sheet

5,364,710

APPARATUS FOR CONVERTING LIGHT ENERGY INTO ELECTRIC ENERGY AND STORING THE SAME

BACKGROUND OF THE INVENTION

1. Field of the Invention

The present invention relates to an apparatus for converting light energy into electric energy and storing the same. In particular, it relates to an energy system in which a photoelectric conversion unit which utilizes a bulk photovoltaic effect and a unit for storing electric energy generated by the unit are combined.

2. Description of the Related Art

In the prior art, an energy converting apparatus for converting light energy into electric energy has been known as a solar battery comprising a semiconductor such as Si, GaAs or the like having a p-n junction. Further, there has been known an energy system in which converted electric energy is stored in a secondary battery so as to make it possible to output the converted energy at a desired time.

When light is irradiated onto the semiconductor having the p-n junction, electrons and positive holes generated by the light irradiation at the junction portion diffuse toward the n and p type sides respectively, and a voltage depending upon the energy band gap (about 0.5 V) is obtained. Due to this low voltage, in the system in which the solar battery utilizing the semiconductor and the secondary battery are combined, a required voltage has been obtained in practical use by connecting a large number of secondary batteries with semiconductor elements in series, or by connecting a booster unit with the secondary battery.

However, there have been such problems that when the secondary batteries are connected in series, the internal resistance increases depending on the number of connected batteries to make the loss of energy large, while when the booster unit is used, the unit requires driving energy therefor. Further, the solar battery has a drawback such that the generating efficiency lowers in accordance with an increase in temperature, resulting in inferior reliability.

SUMMARY OF THE INVENTION

It is an object of the present invention to provide an apparatus with which light energy can be converted into electric energy with high reliability and stored efficiently.

Another object of the present invention is to provide an apparatus for photoelectric conversion and storage of energy, with which a voltage from 10 V to several kV can be obtained.

These objects are accomplished by the inventive device for generating an electromotive force by irradiation of light which comprises a ferroelectric crystal having a bulk photovoltaic effect.

In another embodiment, the invention comprises a ferroelectric crystal having a bulk photoelectric effect which generates an electromotive force upon being irradiated with light and means for storing the electric energy generated by the ferroelectric crystal.

BRIEF DESCRIPTION OF THE DRAWING

The Figure is a drawing of an arrangement of a photoelectric conversion and storage apparatus according to the present invention.

DESCRIPTION OF THE PREFERRED EMBODIMENT

Figure 1:
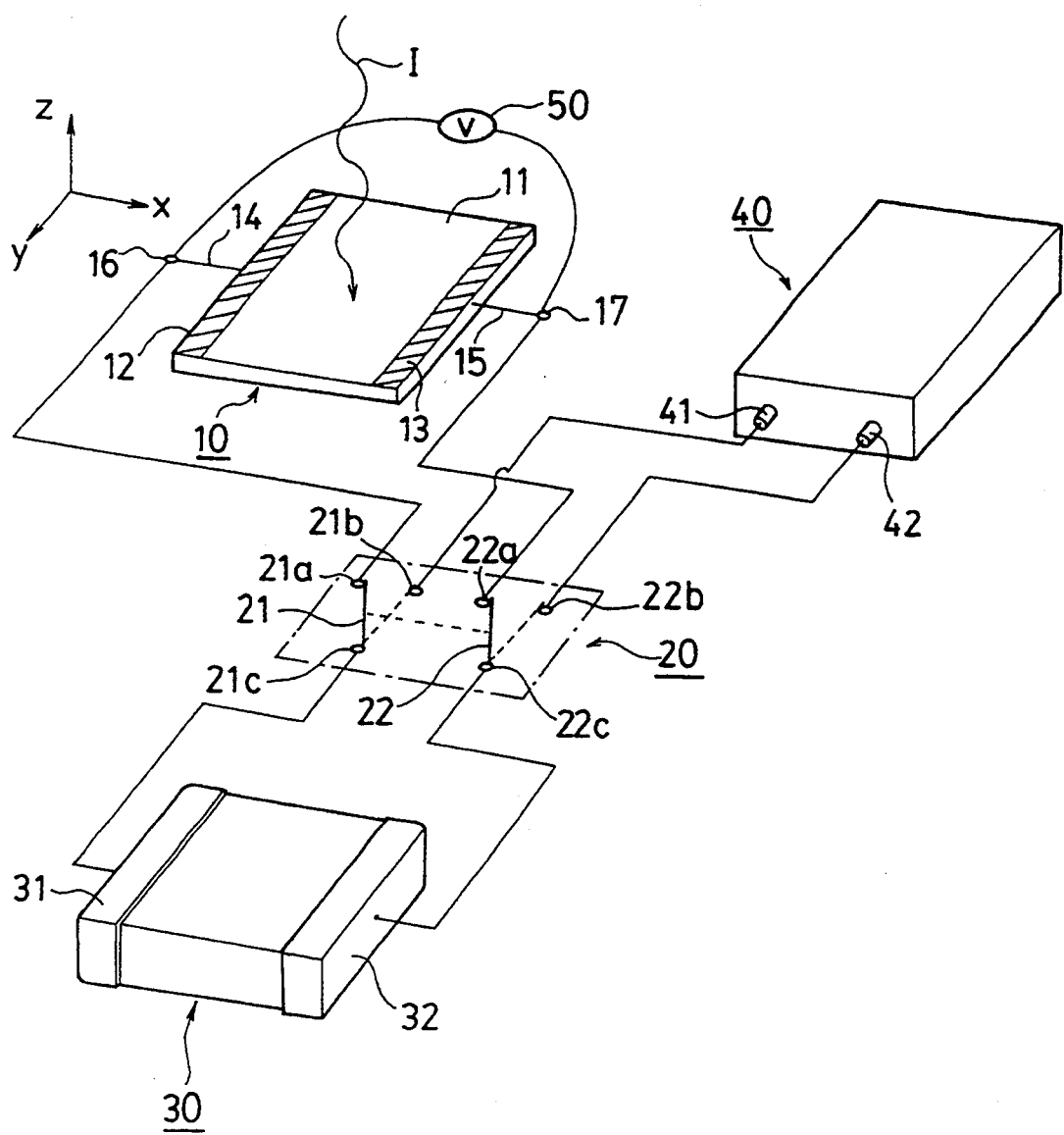

Ferroelectric crystals suitable for use in the invention include not only ferroelectric monocrystals, but also polycrystalline sintered bodies thereof.

The bulk photovoltaic effect is an effect in which when a strongly dielectric crystal is irradiated with light ranging from a visible short wavelength to a wavelength near the ultraviolet region, an electromotive force of several Kv/cm, which is extremely higher than the energy band gap, is generated.

Materials having a bulk photovoltaic effect suitable for the present invention may be exemplified as ferroelectric materials comprising monocrystals of $LiTaO_3$, $LiNbO_3$, $KNbO_3$, $BaTiO_3$ and the like, and polycrystal ferroelectric materials including $BaTiO_3$, lead lanthanum zirconate titanate (PLZT), and the like as a basic composition. These ferroelectric materials are uniform crystal bodies exhibiting a piezo-electric property and having no crystal center symmetry.

A preferred ferroelectric composition is the PLZT system having the formula $(Pb_{1-x}La_x)(Zr_yTi_{1-y})_{1-x/4}O_3$, wherein $0 \leq x \leq 0.10$ and $0.45 \leq y \leq 0.70$ to which up to 2.0 atomic percent of an oxide selected from the group consisting of $Nb_2O_5$, $Ta_2O_5$, $WO_3$, and mixtures thereof, have been added. With this system, polarization is facilitated and a large bulk photovoltaic effect can be generated, which is desirable. In this case, if x is larger than 0.10, or if y is smaller than 0.45 and larger than 0.70, the bulk photovoltaic effect is decreased, so that it is preferable for x and y to be within the above-mentioned ranges. Further, if the amount of the above-mentioned oxides added exceeds 2.0 atomic percent, the bulk photovoltaic effect becomes lower.

The photoelectric conversion unit of the present invention is connected to the electric energy storage unit via a selector switch. For this storage unit one may use a secondary battery such as a lead storage battery, an alkaline storage battery or the like, or a capacitor such as a ceramic capacitor, a film capacitor, or the like. An electric load is connected to the storage unit via the change-over switch.

When uniform light is irradiated onto the element of the photoelectric conversion unit, an electromotive force of several kV/cm, which is much higher than the energy band gap, is generated at the terminals. This is different from the effect of the p-n junction of the semiconductor, which is an essential effect possessed by the substance itself, and is considered to result from the fact that electrons are excited and subjected to transition by means of the impurity centers having a non-central symmetrical potential of the crystal by the irradiation of light.

This electromotive force is a hundred to several thousand of times higher than the electromotive force of a conventional solar battery and which does not become lower due to an increase in temperature as in the case of the p-n junction.

The electric energy having been converted from the light energy by the element is stored in the storage unit via the selector switch. When a capacitor is used as the storage unit, the above-mentioned high voltage can be stored as is.

According to the photoelectric conversion and storage apparatus of the present invention, the following effects are different from the conventional solar battery in which a semiconductor such as Si or the like is used.

(1) In the element having the bulk photovoltaic effect, the generating efficiency does not decrease with increase in temperature, so that the reliability is high.

(2) A high voltage ranging from 10 V to several kV can be obtained directly from the photoelectric conversion unit, so that it is unnecessary during practical use to connect the elements in series in order to increase the output voltage, and no booster unit is required. In particular, it is suitable for driving a high resistance load, such as piezo-electric materials and the like.

(3) The electric energy converted from the light energy is stored in the storage unit, so that it can be out-putted from the storage unit at any desired time.

(4) When a capacitor is used as the storage unit, charging and discharging are not accompanied by a chemical reaction, so that the charging and discharging can be performed in a short period of time, and deterioration is minimized even after repeated charging and discharging.

(5) When a ceramic capacitor, a film capacitor or the like is used as the capacitor, a high voltage ranging from 10 V to several kV can be easily stored.

(6) Since electric power generation is performed by irradiation of light, it is preferable as an electric power source for a load to be installed at a remote place.

As shown in FIG. 1, a photoelectric conversion unit 10 was produced in accordance with the following method.

Lead zirconate titanate having the formula $Pb(Zr_y Ti_{1-y})O_3$ substituted by 3.0 atom percent La was prepared by homogeneously mixing PbO, $ZrO_2$, $TiO_2$, and $La_2O_3$ powders in amounts to obtain a Zr:Ti ratio of 52:48. The mixture was calcined and pulverized to provide a composition having the formula:

$$Pb_{0.97}La_{0.03}(Zr_{0.52}Ti_{0.48})_{0.9925}O_3$$

[hereinafter referred to as PLZT(3/52/48)].

To this composition was added 0.5 atomic percent of $WO_3$, and homogeneous mixing and calcining were performed, followed by pulverization. This fine ceramic powder was shaped by pressing, followed by calcining to produce a square ceramic substrate measuring 25 mm×25 mm×0.6 mm.

Silver paste was printed onto a pair of mutually opposing end edges of this ceramic substrate, followed by baking to thereby form a pair of electrodes 12 and 13 having a width of 2.5 mm. The distance between the electrodes was about 20 mm. This ceramic substrate was immersed in silicone oil at a temperature of 150° C., and a voltage of 1.5 kV/mm was applied to the electrodes 12 and 13 to perform a polarization treatment and obtain a photoelectric conversion element 11. This allowed element 11 to have a spontaneous polarization with an orientation in the x direction in FIG. 1. After the polarization, the electrodes 12 and 13 were contacted by soldering with lead wires 14 and 15 having terminals 16 and 17, respectively, to produce the photoelectric conversion unit 10.

This unit 10 was connected to an electric energy storage unit 30 via a selector switch 20, and the storage unit 30 was connected to an electric load 40 via selector switch 20. Switch 20 has interlocking switches 21 and 22. Switch 21 has contacts 21a and 21b connected to terminal 16 and terminal 41, respectively, of electric load 40. Switch 22 has contacts 22a and 22b connected to terminal 17 and terminal 42, respectively, of load 40.

Further, contact 21c of switch 21 is connected to terminal 31 and contact 22c of switch 22 is connected with terminal 32 of the storage unit 30. In this example, the storage unit 30 was a laminated ceramic capacitor having a capacitance of 0.1 microfarad.

Switches 21 and 22 of change-over switch 20 were switched to positions shown by solid lines in the figure, terminals 16 and 17 were connected to a voltmeter 50 (having an input resistance of not less than $10^{14}$ ohm), and then light from mercury lamp I was irradiated onto element 11 from the z direction in the figure. The mercury lamp light I had a luminous intensity of about 25 $mW/cm^2$ on the element surface.

About 3 minutes after the beginning of the light irradiation, the voltage between terminals 16 and 17 became 10 V, and after the light irradiation was continued for 15 minutes, the voltage thereof became 50 V. After the irradiation was further continued, a voltage of several hundred V was measured. Even after stopping the light irradiation, the voltage value of voltmeter 50 was not changed, and it was determined that the voltage generated in the photoelectric conversion unit 10 was stored in the storage unit 30 via change-over switch 20.

Alternatively, a laminated ceramic capacitor having a capacitance of 0.01 microfarad was used as storage unit 30, and the same light irradiation time allowed the stored voltage in the storage unit 30 to become about 10 times higher in comparison with that in the capacitor having a capacitance of 0.1 microfarad.

What is claimed is:

1. An apparatus for converting light energy into electric energy and storing the same, comprising:
   a photoelectric conversion device for generating an electromotive force by irradiation of light, comprising a ferroelectric polycrystal having the formula $$(Pb_{1-x}La_x)(Zr_yTi_{1-y})_{1-x/4}O_3$$

wherein $0 \leq x \leq 0.1$ and $0.45 \leq y \leq 0.70$ and containing up to 2.0 atomic percent of an oxide is selected from the group consisting of $Nb_2O_5$, $Ta_2O_5$, $WO_3$, and combinations thereof, having a bulk photovoltaic effect; and
   means for storing electrical energy generated by the photoelectric conversion means.

2. The apparatus of claim 1 wherein the means for storing the electrical energy is a capacitor or a secondary battery.

3. The apparatus of claim 1 wherein the photoelectric conversion device is connected to the means for storing electrical energy by a selector switch.

4. The apparatus of claim 1 wherein a load is connected to the means for storing electrical energy by a selector switch.

5. A method for converting light energy to electrical energy and storing the electrical energy comprising irradiating with light a device comprising
   a photoelectric conversion device for generating an electromotive force by irradiation of light, comprising a ferroelectric polycrystal having the formula $$(Pb_{1-x}La_x)(Zr_yTi_{1-y})_{1-x/4}O_3$$

wherein $0 \leq x \leq 0.1$ and $0.45 \leq y \leq 0.70$ and containing up to 2.0 atomic percent of an oxide is selected from the group consisting of $Nb_2O_5$, $Ta_2O_5$, $WO_3$, and combinations thereof, having a bulk photovoltaic effect; and
   means for storing electrical energy generated by the photoelectric conversion means.

* * * * *